US012259852B2

(12) United States Patent
Mitchell et al.

(10) Patent No.: US 12,259,852 B2
(45) Date of Patent: *Mar. 25, 2025

(54) MANAGING FILE REVISIONS FROM MULTIPLE REVIEWERS

(71) Applicant: DocsCorp Group Pty Ltd, Sydney (AU)

(72) Inventors: Ben Mitchell, London (GB); Shane Barnett, Sydney (AU); Nasser Ghazali, Sydney (AU); Barry Dawson, Sydney (AU); Jennifer Ward, Sydney (AU)

(73) Assignee: DocsCorp Group Pty Ltd, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,458

(22) Filed: Aug. 25, 2023

(65) Prior Publication Data

US 2023/0401177 A1    Dec. 14, 2023

Related U.S. Application Data

(63) Continuation of application No. 17/077,612, filed on Oct. 22, 2020, now Pat. No. 11,741,055.

(60) Provisional application No. 62/925,447, filed on Oct. 24, 2019.

(51) Int. Cl.
*G06F 16/18* (2019.01)
*G06F 16/16* (2019.01)
*G06F 16/174* (2019.01)
*G06F 16/23* (2019.01)

(52) U.S. Cl.
CPC ........ *G06F 16/1873* (2019.01); *G06F 16/168* (2019.01); *G06F 16/174* (2019.01); *G06F 16/2358* (2019.01)

(58) Field of Classification Search
CPC .. G06F 16/1873; G06F 16/168; G06F 16/174; G06F 16/2358
See application file for complete search history.

(56) References Cited

U.S. PATENT DOCUMENTS

| | | | |
|---|---|---|---|
| 9,575,764 B1 | 2/2017 | Turner | |
| 9,747,259 B2 * | 8/2017 | Kapadia | G06F 40/194 |
| 9,779,073 B2 * | 10/2017 | Yamat | G06F 40/103 |
| 9,942,121 B2 * | 4/2018 | Poletto | H04L 67/1097 |
| 2010/0312822 A1 | 12/2010 | Howell | |
| 2012/0110445 A1 | 5/2012 | Greenspan | |
| 2019/0197786 A1 | 6/2019 | Molyneaux | |
| 2020/0081964 A1 | 3/2020 | Maneriker | |

* cited by examiner

*Primary Examiner* — Angelica Ruiz
(74) *Attorney, Agent, or Firm* — NIXON PEABODY LLP; Janet Garetto; Sorinel Cimpoes

(57) ABSTRACT

Disclosed are methods and systems for managing file revisions, including revisions of a document. The system may compare various file versions (e.g., revised documents having revisions to a master document from multiple users) with a reference file (e.g., a master document) to obtain the changes (e.g., revisions) in each file version. The system may present the changes from each of the users in a merge interface from which a user may selectively accept or reject the changes from any of the users to update the reference file.

20 Claims, 15 Drawing Sheets

MANAGING FILE REVISIONS FROM MULTIPLE REVIEWERS

CROSS-REFERENCE TO RELATED APPLICATIONS

This application is a continuation of U.S. patent application Ser. No. 17/077,612, filed on Oct. 22, 2020, now allowed, which claims the benefit of U.S. Provisional Patent Application No. 62/925,447, filed on Oct. 24, 2019, each of which is hereby incorporated by reference in its entirety.

TECHNICAL FIELD

The disclosed embodiments relate to managing file revisions, including, for example, managing document revisions from multiple reviewers.

BACKGROUND

A document management system (DMS) is a system used to track, manage and store documents. Most are capable of keeping a record of the various versions created and modified by different users (history tracking). In the case of the management of digital documents such systems are based on computer programs. Some of the salient features provided by DMS can include reviewing and approving documents prior to release, ensuring that relevant versions of applicable documents are available at their "points of use," ensuring that documents remain legible and identifiable, ensuring that external documents (such as third-party provided documents) are identified and controlled, and preventing "unintended" use of obsolete documents.

Current document management systems (DMSs) have some drawbacks. For example, the current DMSs do not have a way to display changes made to a document by multiple users, or even if they display, they may not allow the user to selectively accept or changes from one or more of the users. In another example, the current DMSs do not have a way to display history of changes made to a document by multiple users, or even if they display, they are not readily comprehensible by a user. In another example, the current DMSs do not provide an efficient way for a user to provide or view the reasons for revisions made to a document. In another example, the current DMSs do not have an efficient way of handling (e.g., merging) branched revisions ("branch merge"). A branched revision is a scenario in which a document is revised by a first set of users to generate a first sequence of versions and an intermediate version from the first set of versions is revised by a second set of users to generate a second set of versions. The final version of the document may be obtained by merging a final version from the second set with final version from the first set (including all changes made to the first set since the intermediate version). The current DMSs do not handle the merging of branched revisions efficiently. Accordingly, an improved document revision management system (DRMS) that enables the users to gain understanding and management of document revisions efficiently and conveniently may be preferred.

SUMMARY

Aspects of the disclosed embodiments relate to methods, apparatuses, and/or systems for managing document revisions from multiple reviewers.

In some embodiments, a revision management system ("system") facilitates management of file revisions from multiple reviewers. The system may compare various file versions (e.g., revised documents having revisions from multiple reviewers) with a reference file (e.g., a master document) to obtain the changes (e.g., revisions) in each file version. The system may present the changes from each of the file versions in a merge interface (also referred to as "review user interface") from which a user may selectively accept or reject the changes from any of the file versions to update the reference file.

The system may present the review user interface having the revisions from multiple reviewers in association with a copy of the master document presented in a document user interface. For example, the system may present the review interface in a first portion of a display device and the copy of the master document in a second portion of the display device. The review user interface may present a set of revisions associated with a portion of the copy of the master document displayed in the document user interface. For example, the review user interface may show a set of revisions associated with a paragraph of the copy of the master document displayed in the document user interface. The set of revisions may include revisions from multiple reviewers for that paragraph. A user (e.g., an author or owner of the master document) may select (e.g., accept or reject) revisions of one or more reviewers from the set of revisions and the copy of the master document may be updated in the document user interface based on the selected revisions.

In some embodiments, the system also manages conflicts between revisions. For example, if the user has accepted a revision from a first reviewer for a specified content in the master document, such as insertion of a word between two words in a paragraph, the review user interface may not allow the user to select a revision of the same content from a second reviewer, such as insertion of another word between the same two words in the paragraph. In some embodiments, the system may use any of a number of techniques in determining if there is a conflict between two revisions.

The system performs a comparison between two documents, e.g., a master document and a revised document, to obtain the revisions to the master document. In some embodiments, the system performs the comparison using data structures representing the content of the documents. A data structure represents content of a document using a sequence of blocks, and any content (e.g., a character, word, sentence, etc.) in the document can be located or referenced using a location coordinate of the content. The location coordinate may include (a) a block number, which indicates a block in the sequence of blocks the content is in, and (b) a position, which indicates the position of the content within the block. By comparing a data structure of the master document with a data structure of the revised document, the system obtains the location coordinates of the revisions in the revised document and a target location coordinate in the master document where the revision occurs in the revised document. When a user accepts the revision, the system may extract the revision based on the location coordinates of the revision in the revised document and update a copy of the master document at the target location coordinate. A location coordinate of a specified content in one document may be used to find the corresponding content in any other document, which may be used in finding the revisions from any of the multiple revised documents, and maintain a synchronization between the revised documents and the copy of the master document even as the copy of the master document is continuously updated with the user selected revisions.

Various other aspects, features, and advantages of the invention will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Some of the terms in the following description may be used interchangeably. For example, a "reference file" and "master document," a "modified file" and "revised document," a "change" and "revision," a "merge interface" and "review user interface," and a "reference data structure" and "master data structure," may be used interchangeably.

Figure 1:
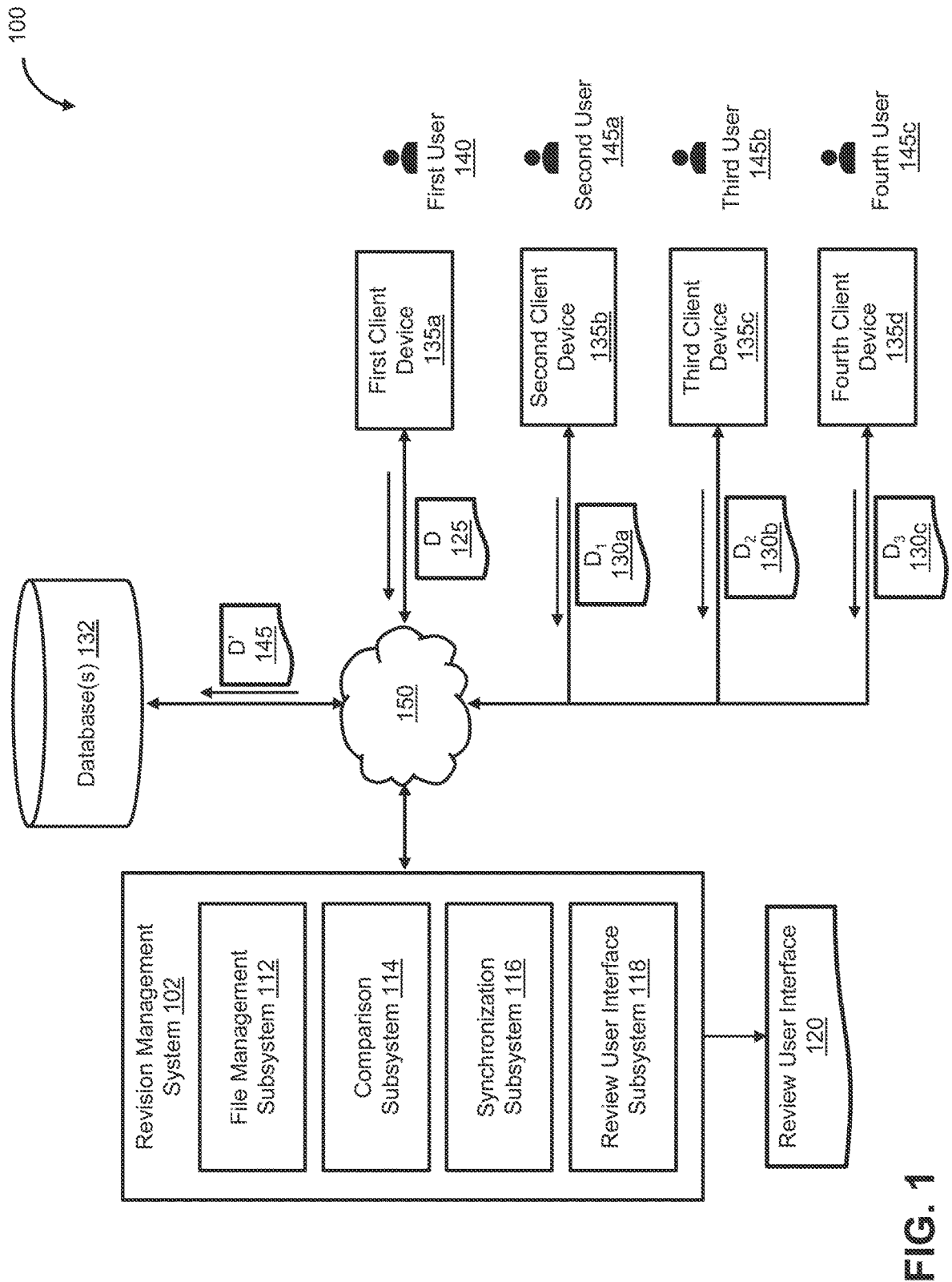
FIG. 1 shows an environment in which the disclosed embodiments may be implemented, in accordance with one or more embodiments.

FIG. 1 shows an environment 100 in which the disclosed embodiments may be implemented, in accordance with one or more embodiments. As shown in FIG. 1, the environment 100 may include a revision management system ("system") 102, client devices 135a-d associated with users 140 and 145a-c, database(s) 132, or other components. The system 102 may include file management subsystem 112, comparison subsystem 114, synchronization subsystem 116, review user interface subsystem 118, or other components. By way of example, the system 102 may be any computing device, such as a personal computer (PC), a laptop computer, a tablet computer, a hand-held computer, other computer equipment, or may be implemented as a cloud-based service. The client devices 135 may include any type of mobile terminal, fixed terminal, or other device. By way of example, client devices 135 may include a PC, a laptop computer, a tablet computer, other computer equipment, including "smart," wireless, wearable, and/or mobile devices.

A component of environment 100 may communicate with one or more components of environment 100 via a communication network 150 (e.g., Internet, a mobile phone network, a mobile voice or data network, a cable network, a public switched telephone network, or other types of communications network or combinations of communications networks). The communication network 150 may be a wireless or wired network. As an example, the client devices 135a-d may interact with the system 102 via the above described communication network. As another example, the client devices 135a-d and the system 102 may communicate wirelessly.

It should be noted that, while one or more operations are described herein as being performed by particular components of the environment 100, those operations may, in some embodiments, be performed by other components of the environment 100. As an example, while one or more operations are described herein as being performed by the system 102, those operations may, in some embodiments, be performed by the client devices 135.

In some embodiments, the system 102 facilitates management of document revisions from multiple reviewers. A master document (also referred to as a "reference file"), "D," 125 associated with a first user 140 may have content created by the first user 140. A first reviewer, such as a second user 145a, may access the master document 125 (e.g., from a database 132, a cloud storage service, or other storage location) using a second client device 135b, perform revisions (e.g., make changes) and generate a new version of the master document 125, such as a revised document, $D_1$, 130a. Similarly, other reviewers such as a third user 145b and a fourth user 145c may generate other versions of the master document 125, such as a revised document 130b $D_2$ and a revised document 130c $D_3$, respectively. The revised documents 130a-c may be stored at various locations, e.g., respective client devices 135a-c of the user 140 and 145a-c, database 132, cloud storage service, or other storage locations. The system 102 may compare various document versions (e.g., the revised documents 130a-130c) having revisions from multiple reviewers 145a-c with a reference document (e.g., master document 125) to obtain the revisions in each document version.

The system 102 may present the revisions from each of the reviewers 145a-c in a review user interface (UI) 120 along with a copy of the master document 145 in another user interface. A user, e.g., an author or owner of the master document 125 such as the first user 140, may select (e.g., accept or reject) one or more revisions of one or more of the reviewers 145a-c from the review UI 120 for updating a copy of the master document 145. Upon receiving the user selection of the revisions from the review UI 120, the system 102 may cause the copy of the master document 145 to be updated based on the user selected revisions and store the updated copy of the document 145 (e.g., in database 132 or the first client device 135a).

Figure 2A:
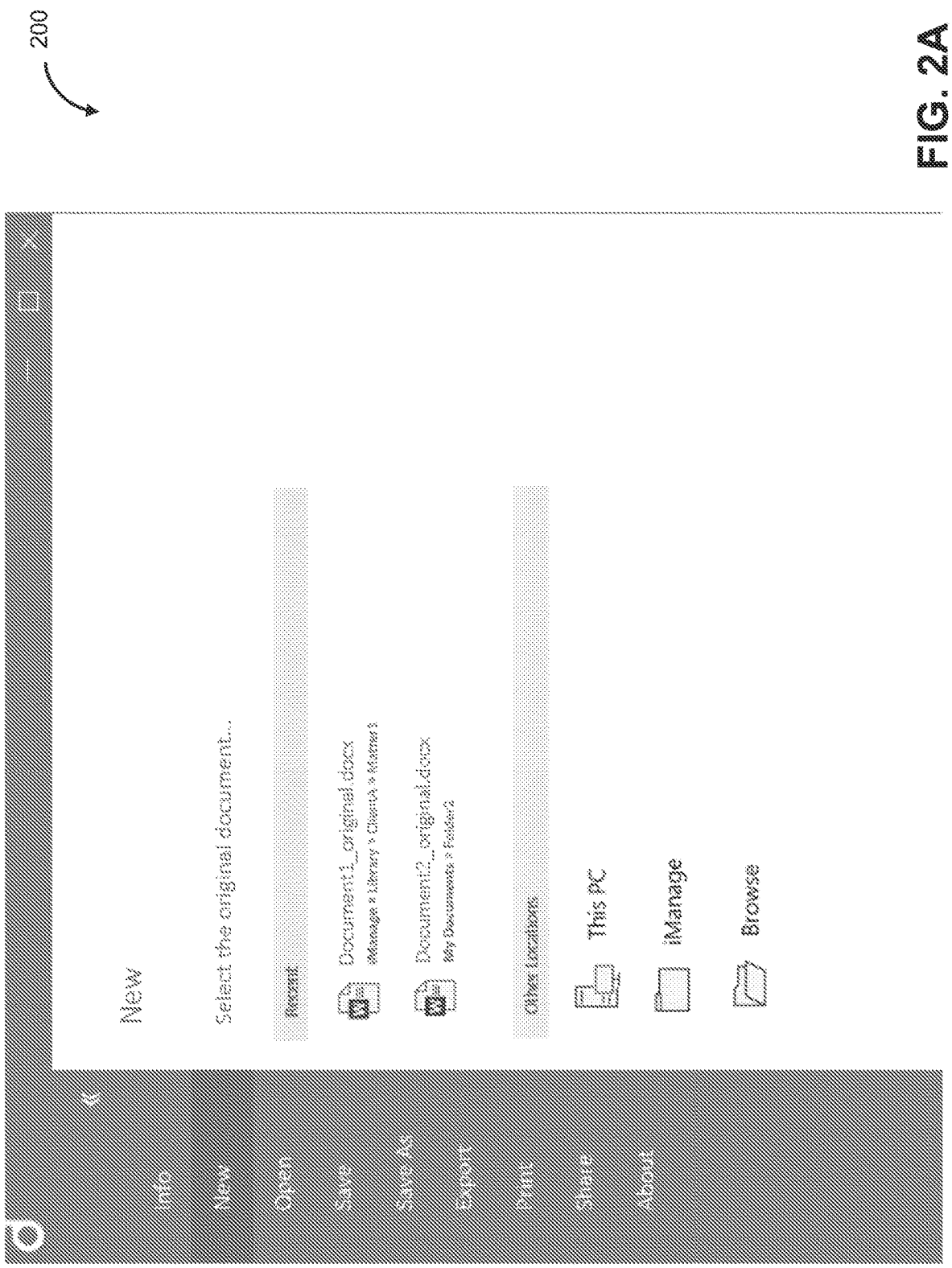
FIG. 2A illustrates a screenshot of a first file manager user interface (UI), in accordance with one or more embodiments.
Figure 2B:
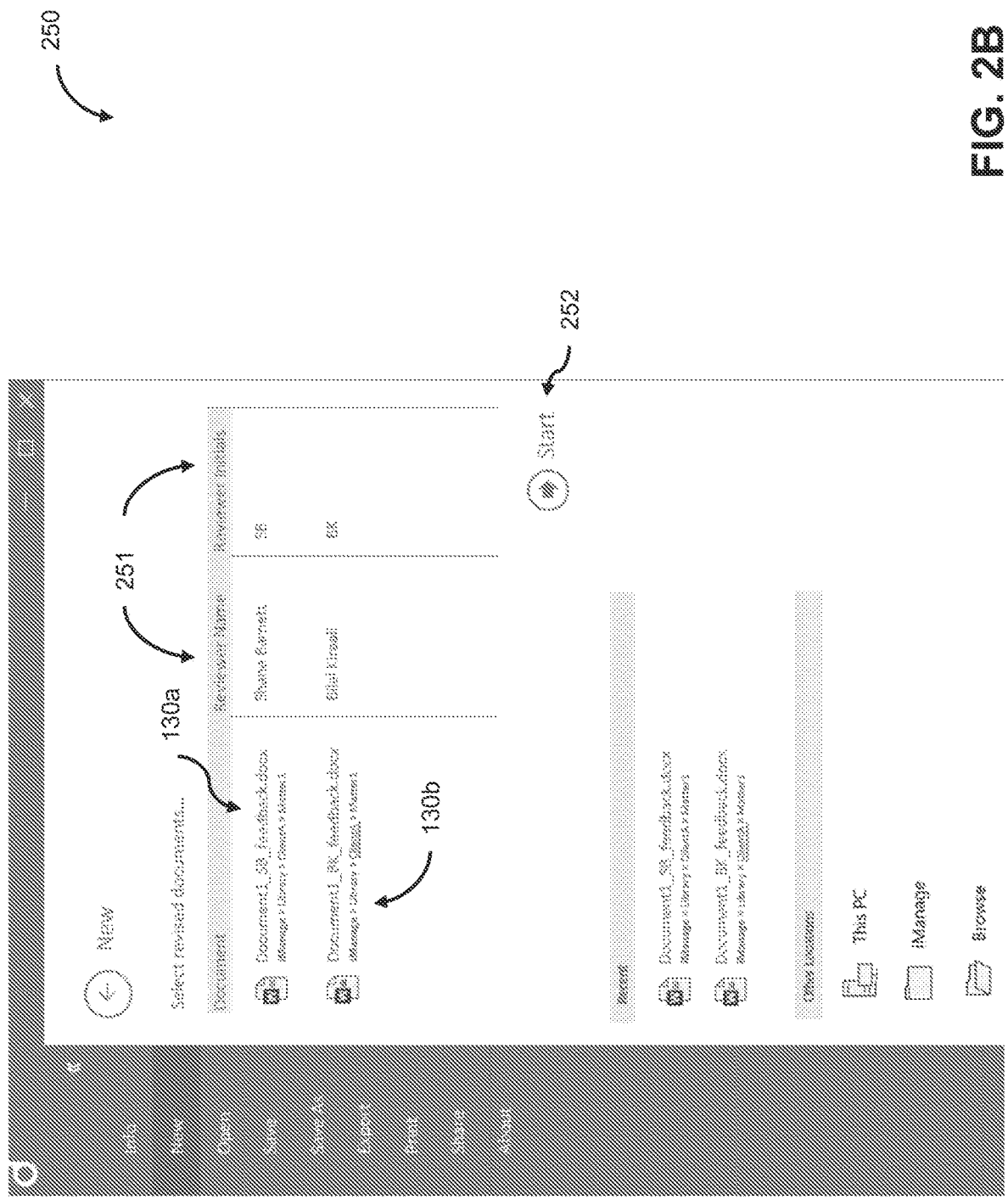
FIG. 2B illustrates a screenshot of a second file manager UI, in accordance with one or more embodiments.

In some embodiments, the file management subsystem 112 may facilitate a user, such as the first user 140, to obtain various documents for performing the comparison. For example, the file management subsystem 112 may provide a file manager UI, such as a file manager UI 200 of FIG. 2A, to obtain the documents for performing the comparison. FIG. 2A illustrates a screenshot of a first file manager UI 200, in accordance with one or more embodiments. The first file manager UI 200 facilitates the first user 140 to obtain the master document 125 from a specified location (e.g., from the first client device 135a, the database 132, or another location such as a cloud storage service). Similarly, the file management subsystem 112 may provide another file manager UI, such as a second file manager UI 250 of FIG. 2B, to obtain the revised documents 130a-c. FIG. 2B illustrates a screenshot of a second file manager UI, in accordance with one or more embodiments. The second file manager UI 250 facilitates the first user 140 to obtain the revised documents (e.g., revised document 130a and revised document 130b) from one or more locations (e.g., from the first client device 135a, the database 132, or another location such as a cloud storage service). The second UI manager 250 may also facilitate the first user 140 to set or change personal identifiable information (PI) 251 of the reviewers, such as a reviewer name or initials, for each of the revised documents. After selecting the master document 125 and the revised documents 130a-c, the first user 140 may initiate the comparison of the documents using a first graphical user interface (GUI) element 252, such as a button.

Referring back to FIG. 1, in some embodiments, the comparison subsystem 114 may facilitate a comparison of the documents. For example, the comparison subsystem 114 may facilitate comparison of the master document 125 with each of the revised documents 130a-c to obtain the revisions from each of the revised documents 130a-c. The revisions obtained from a particular revised document 130a are revisions relative to the master document 125 (e.g., changes made to the revised document 130a relative to the master document 125). A revision may include any type of change to master document 125. For example, the revision may include an insertion of one or more characters in the revised document relative to the master document, deletion of one or more characters in the revised document relative to the master document, or another change. In some embodiments, the comparison subsystem 114 may compare the master document 125 with the revised documents 130a-c using any of a number of comparison methods for obtaining the revisions. In some embodiments, the comparison subsystem 114 may compare the master document 125 with the revised documents 130a-c using a data structure that is representative of content in each of the documents.

In some embodiments, the synchronization subsystem 116 may generate a data structure representing the content of a document. A data structure represents content of a document using a sequence of blocks, and any content (e.g., a character, word, sentence, etc.) in the document may be located or referenced using a location coordinate of the content. The location coordinate may include (a) a block number, which indicates a block in the sequence of blocks the content is in, and (b) a position, which indicates the position of the content within the block. The synchronization subsystem 116 may generate such a data structure for each of the documents involved in the comparison, e.g., the master document 125, each of the revised documents 130a-c, and the copy of the master document 145. By comparing a data structure of the master document 125 with a data structure of a revised document 130a, the comparison subsystem 114 may obtain (a) the location coordinates of the revisions in the revised document 130a, (b) the content of the revision, and (c) a target location coordinate in the master document 125 where the revision occurs in the revised document 130a. When a user accepts the revision, the comparison subsystem 114 may extract the revision based on the location coordinates of the revision in the revised document 130a and update the copy of the master document 145 at the target location coordinate. A location coordinate of a specified content in one document may be used to find the corresponding content in any other document, and maintain a synchronization between the master document 125, the revised documents 130a-c and the copy of the master document 145 even as the copy of the master document 145 is continuously updated based on the user selected revisions. Additional details with respect to performing the comparison using data structures are illustrated at least with reference to FIGS. 3A-3C below.

Figure 3A:
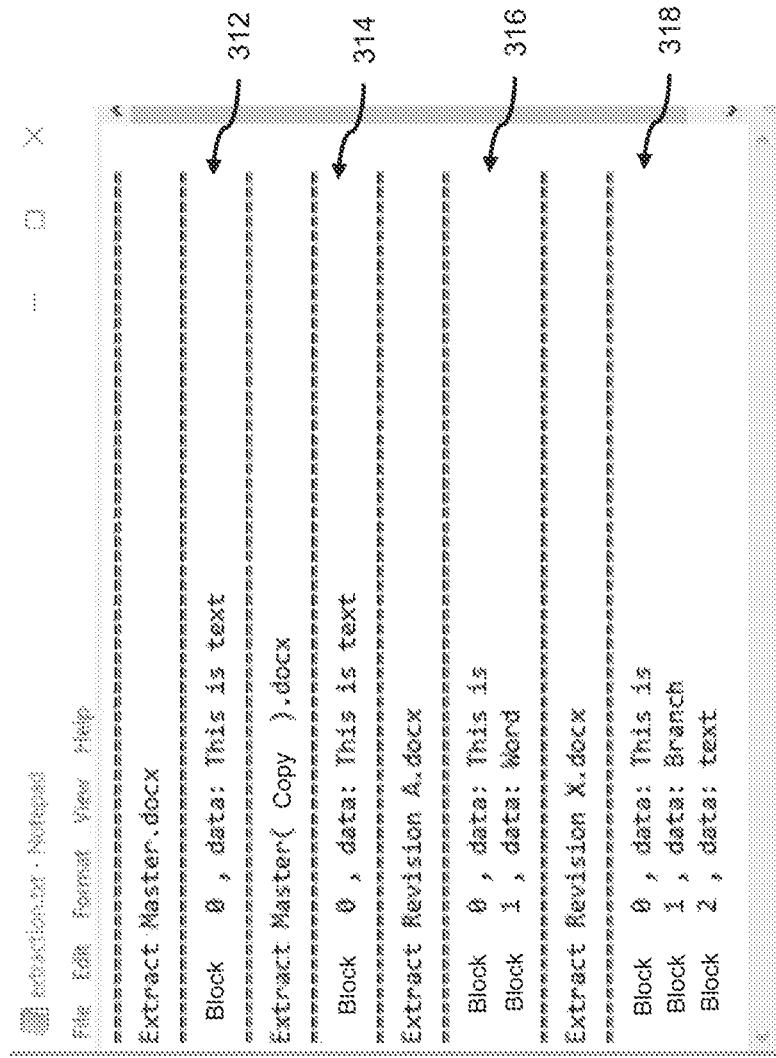
FIG. 3A shows generation of data structures for various documents, in accordance with one or more embodiments.

FIG. 3A shows generation of data structures for various documents, in accordance with one or more embodiments. The synchronization subsystem 116 generates a data structure for each of a master document 325 and a copy of the master document 345, and for each of a revision A document 330a and revision X document 330b, which contain revisions to the master document 325 from reviewer A and X, respectively. In some embodiments, the master document 325 may be similar to the master document 125 of FIG. 1, and the copy of the master document 325 may be similar to the copy of the master document 145. Similarly, in some embodiments, the revision A document 330a may be similar to the revised document 130a, and the revision X document 330b may be similar to the revised document 130b.

The synchronization subsystem 116 generates a master data structure 312 that is representative of the content "This is text" of the master document 325. The master data structure 312 represents the content "This is text" of the master document 325 as "Block 0." Similarly, the synchronization subsystem 116 generates a copy data structure 314 that represents the content "This is text" of the copy of the master document 345 as "Block 0." Note that both the master data structure 312 and the copy data structure 314 are similar (e.g., at least until the copy of the master document 345 is updated with the revisions). A first data structure 316 represents the content of revision A document 330a "This is Word" using two blocks in which "Block 0" represents "This is" and "Block 1" represents "Word." A second data structure 318 represents the content of the revision X document 330a "This is Branch text" using three blocks in which "Block 0" represents "This is" and "Block 1" represents "Branch" and "Block 2" represents "text."

As shown in the data structures 312-318, the synchronization subsystem 116 has represented the content of the master document 325 using one block and content of other documents using a sequence of blocks. The number of blocks to be used for representing the content of a document may be predetermined, determined dynamically based one or more conditions (e.g., size of document, number of documents being compared, or other conditions), or determined randomly. Each block of the sequence of blocks may represent a distinct portion of the content of a document. The size of each block (e.g., number of characters in a block) may also be variable. Further, the number of blocks used to represent content of one document may be same or different from the number of blocks used to represent content of another documents, regardless of the size of the two documents.

Figure 3B:
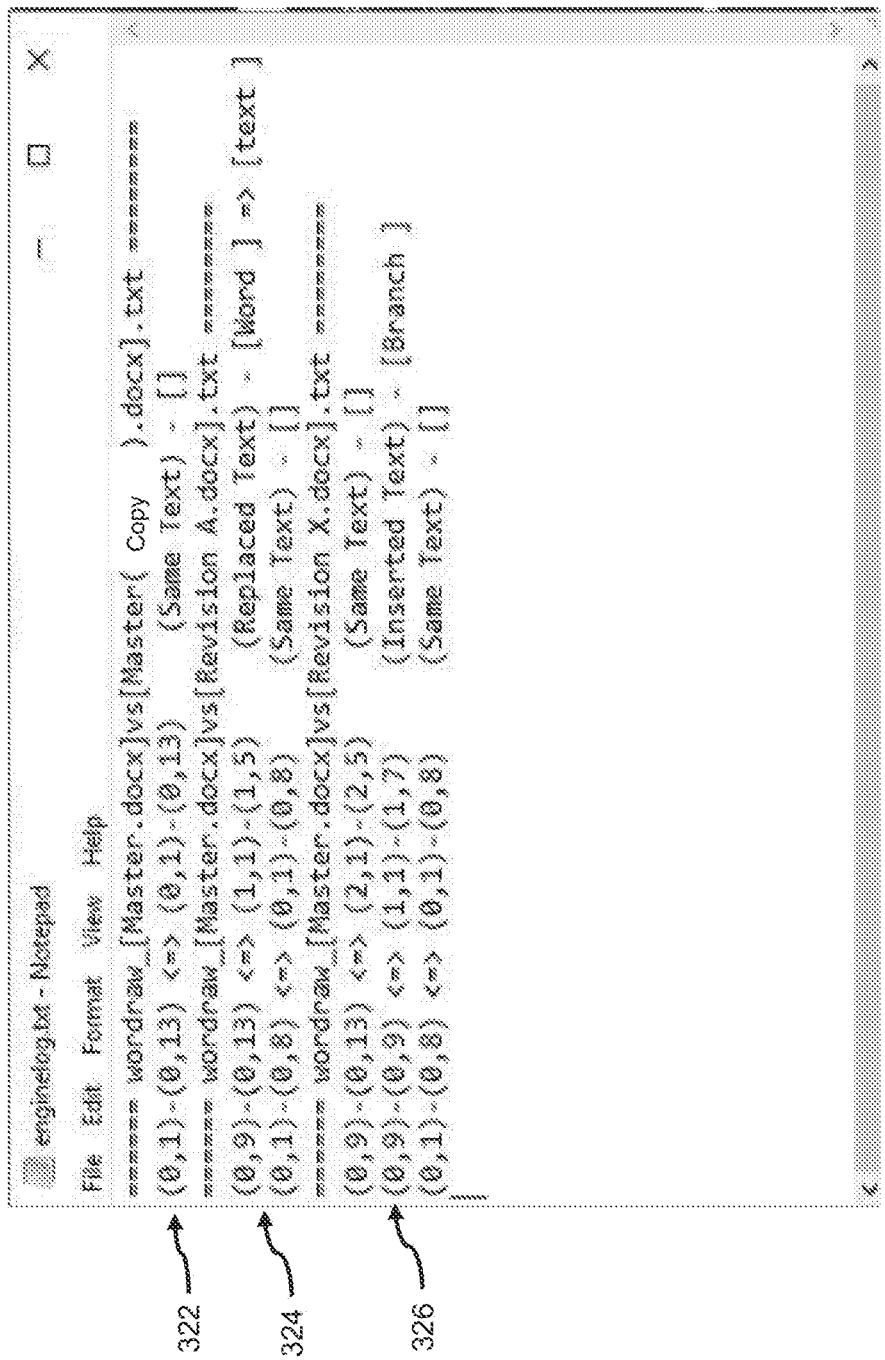
FIG. 3B shows a result of the comparison between a master document and multiple revised documents, in accordance with one or more embodiments.

FIG. 3B shows a result of the comparison between the master document 325 and each of the revised documents 330a-b, in accordance with one or more embodiments. The comparison subsystem 114 compares the master document 325 and the copy of the master document 345 using their data structures—master data structure 312 and copy data structure 314—to generate a first comparison 322. The first comparison 322 indicates that the content from "Block 0, position 1" (e.g., represented as (0,1)) to "0,13" in the master document 325 is the same as the content from (0,1) to (0,13) in the copy of the master document 345. As described above, "Block 0" indicates the block number of the content and "position 1" indicates position of the content within the "Block 0". For example, the content at (0,1) in the master document 325 corresponds to the character "T."

The comparison subsystem 114 compares the master document 325 and the revision A document 330a using their data structures—master data structure 312 and first data structure 316—to generate a second comparison 324, which corresponds to the revisions from the reviewer A. The second comparison 324 indicates that the content from (0,1) to (0,8) in the master document 325, which corresponds to the text "This is" is the same as the content from (0,1) to (0,8) in the revision A document 330a. Next, the second comparison 324 indicates that the content from (0,9) to (0,13) in the master document 325 (e.g., which corresponds to the text "text") is changed/revised to the content from (1,1) to (1,5) in the revision A document 330a (e.g., which corresponds to the word "Word"). That is, the second comparison 324 indicates (a) a target location coordinate (0, 9) of the master document 325 at which the revision occurs, (b) a starting location coordinate and an ending location coordinate (e.g., (1,1) to (1,5)) of the revision in the revision A document 330a, and (c) the content or details of the revision (e.g., as replacement of "text" with "Word"). In some embodiments, the replacement revision may also be indicated as a combination of deletion and insertion revision (e.g., as deletion of "text" and insertion of "Word.")

The comparison subsystem 114 compares the master document 325 and the revision X document 330b using their data structures—master data structure 312 and second data structure 318—to generate a third comparison 326, which corresponds to the revisions from the reviewer X. The third comparison 326 indicates that the content at (0,9)-(0,9) in the master document 325 (e.g., which corresponds to an insertion position between "is" and "text") is changed/revised to the content from (1,1) to (1,7) in the revision X document 330b, which corresponds to "Branch". That is, the third comparison 326 indicates that a revision occurs at a target location coordinate (0, 9) of the master document 325 and the content of the revision corresponds to the content from a starting location coordinate of (1,1) to an ending location coordinate (1,7) in the revision X document 330b.

The third comparison 326 also indicates the details of the revision as insertion of text (e.g., "Branch"). The third comparison 326 indicates that the remainder of the revision X document 330b is similar to the master document 325.

Figure 3C:
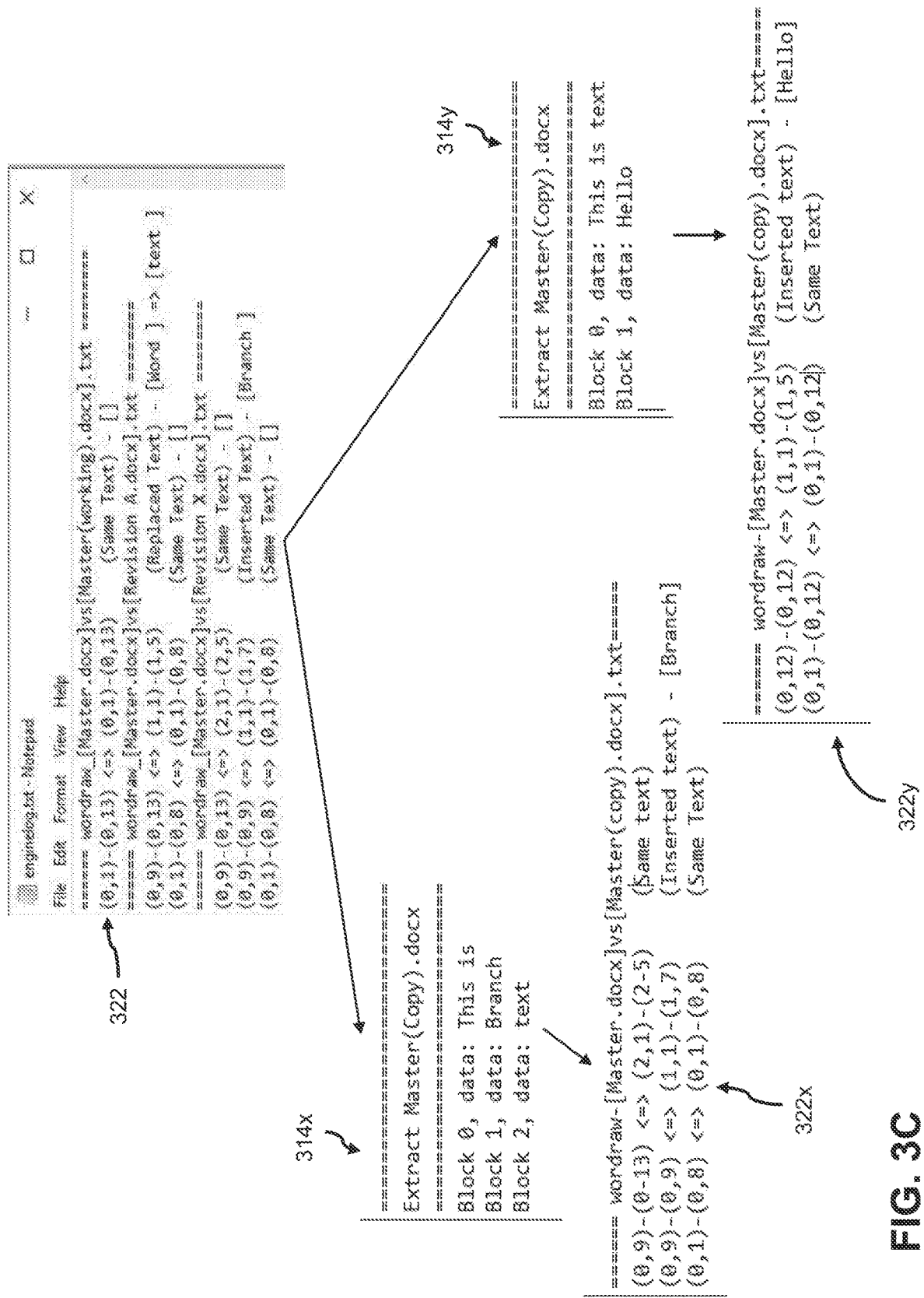
FIG. 3C shows updating of a data structure of a copy of the master document, and updating of a comparison of the master document and the copy of the master document, in accordance with one or more embodiments.

FIG. 3C shows updating of a data structure of the copy of the master document, and updating of a comparison of the master document and the copy of the master document, in accordance with one or more embodiments. In order to maintain a synchronization between the master document 325 and the copy of the master document 345, whenever the copy of the master document 345 is updated, the copy data structure 314 and a comparison between the master document 345 and the copy of the master document 345 is also updated. A user, e.g., the first user 140, may update the copy of the master document 345 in many ways. The first user 140 may update the master document 345 by directly typing into the copy of the master document 345 or by selecting the revisions (e.g., accepting or rejecting) the revisions from the reviewers A or X. For example, when the first user 140 accepts the revision from reviewer X, which is insertion of the word "Branch" between "This is" and "text," the copy of the master document 345 is updated by inserting the word "Branch" between "This is" and "text" in the copy of the master document 345. The synchronization subsystem 116 may update the copy data structure 314 to the copy data structure 314x in response to user acceptance of the revision. The comparison subsystem 114 may further generate an updated comparison 322x between the master document 325 and the updated copy of the master document 345 based on the updated copy data structure 314x.

In another example, when the first user 140 directly types content, such as the word "Hello" in the copy of the master document 345 after "This is text," the copy of the master document 345 is updated by inserting the word "Hello" after "This is text". The synchronization subsystem 116 may update the copy data structure 314 to the copy data structure 314y in response to the first user 140 typing the text into the copy of the master document 325. The comparison subsystem 114 may further generate an updated comparison 322y between the master document 325 and the updated copy of the master document 345 based on the updated copy data structure 314y.

As illustrated at least with reference to FIGS. 3A-3C, by comparing a data structure of the master document with a data structure of a revised document, the comparison subsystem 114 may obtain (a) the location coordinates of the revisions in the revised document, (b) the content of the revision, and (c) a target location coordinate in the master document where the revision occurs in the revised document. A location coordinate of a specified content in one document may be used to find the corresponding content in any other document, and maintain a synchronization between the revised documents 130a-c and the copy of the master document 145 even as the copy of the master document 145 is continuously updated with the user selected revisions. For example, as illustrated in comparison 322x of FIG. 3C, a location of (1,1) in the copy of the master document to the location (0,9) in the master document 325. Such cross-location references may be used in identifying the corresponding content between any documents that aids in determining the location of the specified content across documents and in determining any potential revisions between the documents.

Figure 4:
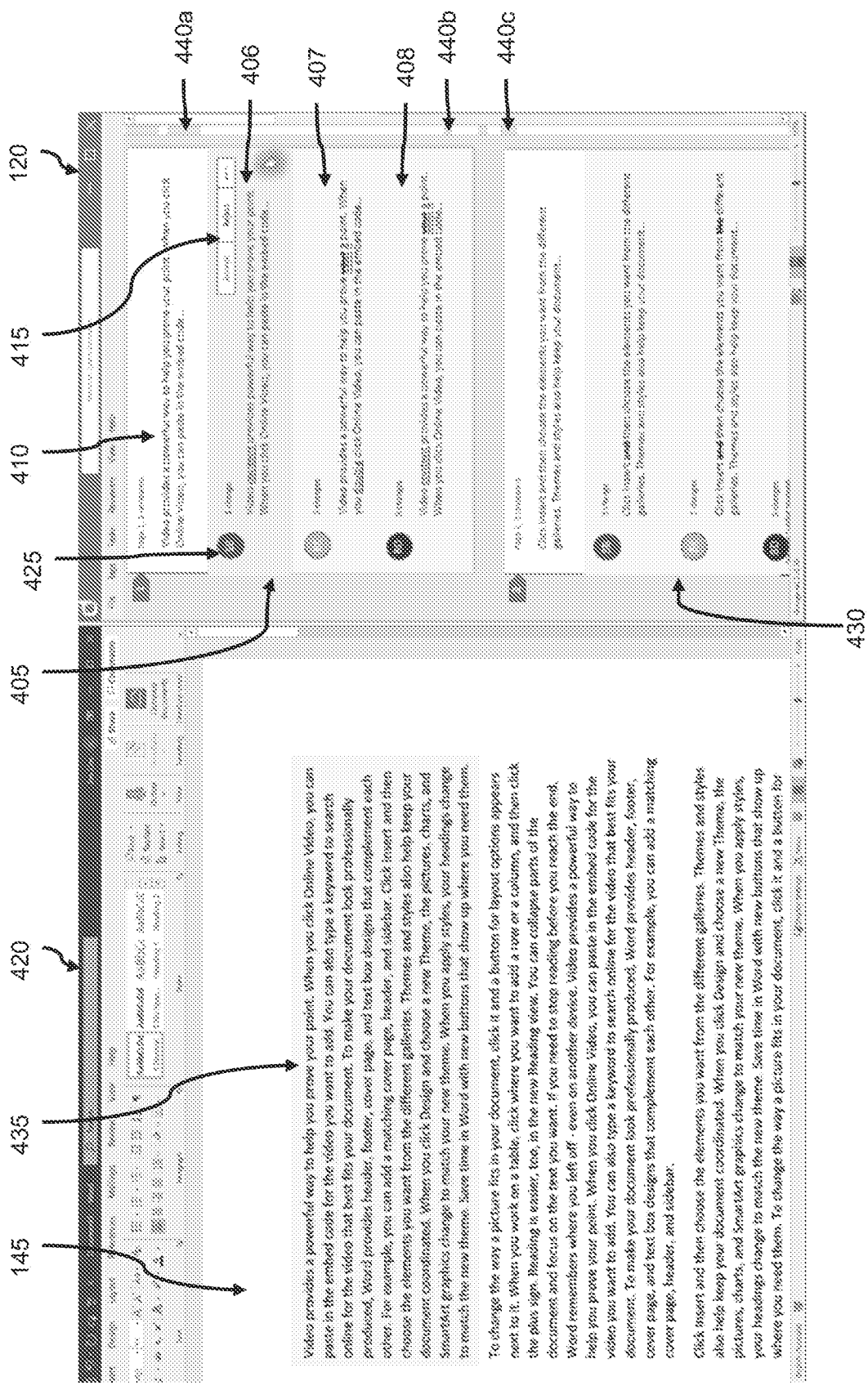
FIG. 4 is a screenshot of a review UI, in accordance with one or more embodiments.

Referring back to FIG. 1, the review user interface subsystem 118 provides a review user interface 120 to present the revisions from multiple reviewers 145a-c. The revisions of multiple reviewers may be obtained at least as described with reference to FIGS. 3A-3C. An example screenshot of the review UI 120 is shown in FIG. 4. FIG. 4 is an example screenshot of the review UI, in accordance with one or more embodiments. The review UI 120 presents the revisions from all the reviewers 145a-c (e.g., simultaneously). The revisions are obtained by comparing the master document 125 with each of the revised documents 130a-c associated with the reviewers 145a-c. The review UI subsystem 118 may present the review UI 120 in association with the copy of the master document 145. In some embodiments, the copy of the master document 145 is presented in a user interface different and independent from the review UI 120, such as a document user interface 420.

In some embodiments, the review UI 120 may group the revisions based on a document portion (e.g., paragraph) of the master document 125. For example, the review UI subsystem 118 may group a first set of revisions 405 based on a document portion 410 of the master document 125. The review UI 120 may display the document portion 410 of the master document 125 with the first set of revisions 405 indicating that the first set of revisions 405 corresponds to the document portion 410 of the master document 125. The first set of revisions 405 may include revisions from multiple reviewers 145a-c for the document portion 410. For example, the first set of revisions 405 may include a first revision 406 from a first reviewer 145a, a second revision 407 from a second reviewer 145b, and a third revision 408 from a third reviewer 145c. In some embodiments, the review UI 120 may also display a user indicator 425 along with the revision that includes PII of the reviewer (e.g., reviewer name, initials, color code, or other information). For example, the review UI 120 may display the user indicator 425 having initials "SB" of a first reviewer 145a with the first revision 406.

A user associated with the master document 125 (e.g., an author or owner of the master document 125, such as the first user 140) may select one or more revisions from the review UI 120 to update the copy of the master document 145. In some embodiments, selecting a revision may include accepting or rejecting the revision. The first user 140 may also choose to ignore the revision (e.g., neither accept nor reject). In some embodiments, the first user 140 may reject a revision implicitly or explicitly. For example, the first user 140 may reject a change implicitly by accepting another change and rejecting a change explicitly by rejecting the change. The first user 140 may select one or more revisions from the first set of revisions 405. For example, the first user 140 may select the first revision 406 from the first reviewer 145a, which may correspond to accepting the insertion of the word "content," and may accept some of the changes from the third reviewer 145c in the third revision 408, which may correspond to accepting the deletion of the word "your" and insertion of the letter "a." In another example, the first user 140 may accept the revisions of the second reviewer 145b and ignore the revisions of the other reviewers. Upon receiving a user selection of a revision in the review UI 120, the review UI subsystem 118 may cause the copy of the master document 145 to be updated accordingly. For example, upon receiving the user selection of the above revisions of the first reviewer 145a and the third reviewer 145c, the review UI subsystem 118 causes the copy of the master document 145 to be updated by inserting the word "content" next to the first word of the first paragraph "Video," and replacing the word "your" with the letter "a."

The first user 140 may select the revisions in a number of ways. In some embodiments, the review UI 120 may provide a revision selection tool 415 that may facilitate the user to accept or reject the revisions. In some embodiments, the revision selection tool 415 may also allow the first user 140 to accept or reject all revisions from a particular user in a particular set of revisions (e.g., for a specific document portion of the master document 125) or in the entire document. In some embodiments, the revision selection tool 415 may also allow the first user 140 to hide all revisions from a particular user in a particular set of revisions or in the entire document. In some embodiments, the review UI 120 may allow the user to select a particular revision using a context sensitive menu, such as tapping or right-clicking on a particular change to activate a menu from which the user may choose to accept or reject the particular change.

In some embodiments, the review UI 120 may display the revisions corresponding to a document portion of the copy of the master document 145 displayed in the document UI 420. For example, the review UI subsystem 118 may determine a document portion 435 (e.g., a paragraph) of the copy of the master document 145 that is currently being displayed in the document UI 420 and cause the review UI 120 to show the first set of revisions 405 corresponding to that document portion 435. In some embodiments, the document portion 435 of the copy of the master document 145 may correspond to the document portion 410 of the master document 125. While the document portion 435 of the copy of the master document 145 may change (e.g., when the first user 140 types in the copy of the master document 145 or selects one or more revisions from the first set of revisions 405), the document portion 410 of the master document 125 may not change as the revisions are applied to the copy of the master document 145 and not the master document 125. In FIG. 4, the document UI 420 is displaying three paragraphs and the review UI 120 is display the revisions associated with the three paragraphs, e.g., the first set of revisions 405 for the first paragraph and a second set of revisions 430 for the third paragraph. The second paragraph does not have any revisions associated with it.

In some embodiments, the review UI subsystem 118 may provide revision location indicators 440a-c (also referred to as "change location indicators") in the review UI 120 (e.g., in a scroll bar of the review UI 120) that indicate the document portions for which revisions exist. In some embodiments, the review UI 120 may navigate to a corresponding revision when a specific revision location indicator is selected by the user. For example, if the first user 140 selects the revision location indicator 440c, the review UI 120 may display the revision corresponding to the document portion identified by the revision location indicator 440c and causes the corresponding document portion of the copy of the master document 145 to be shown in the document UI 420.

While the foregoing paragraphs describe revising a copy of the master document 145 based on the revisions from the revised documents 130a-c relative to the master document 125, the system 102 also facilitates merging of revisions that branch out from a revised document (e.g., a further revised document having revisions relative to the revised document). For example, the first revised document 130a $D_1$ from the first reviewer 145a has revisions relative to the master document 125, and a further revised document ($D_{11}$) may have revisions relative to the first revised document 130a $D_1$ from a fifth reviewer. While the fifth reviewer works on the further revised document $D_{11}$, the first reviewer 145a may continue to make further revisions to the first revised document 130a $D_1$. The fifth reviewer may submit the further revised document $D_{11}$ to the system 102 after making changes in the further revised document $D_{11}$.

Upon receiving the further revised document $D_{11}$ from the fifth reviewer, the system 102 may determine that the further revised document $D_{11}$ is not the final version of the first revised document $D_1$ as it is a revision that branched out from another version (e.g., the first revised document 130a $D_1$). Accordingly, the system 102 indicates to the first user 140 to consolidate the revisions from the further revised document $D_{11}$ into the first revised document 130a $D_1$ to generate a final version of the first revised document 130a $D_1$, which may then be compared with the master document 125. The system 102 may present the first user 140 a view of all the changes that happened since the first revised document 130a $D_1$ was provided to the fifth reviewer until the final version of the first revised document 130a $D_1$ is generated, to assist the first user 140 in consolidating the changes from the revised document $D_{11}$ into the first revised document 130a $D_1$. After consolidating the changes from the revised document $D_1$ into the first revised document 130a $D_1$, the first user 140 may then incorporate the revisions from the first revised document 130a $D_1$ to the copy of the master document 145 as described above.

Figure 5:
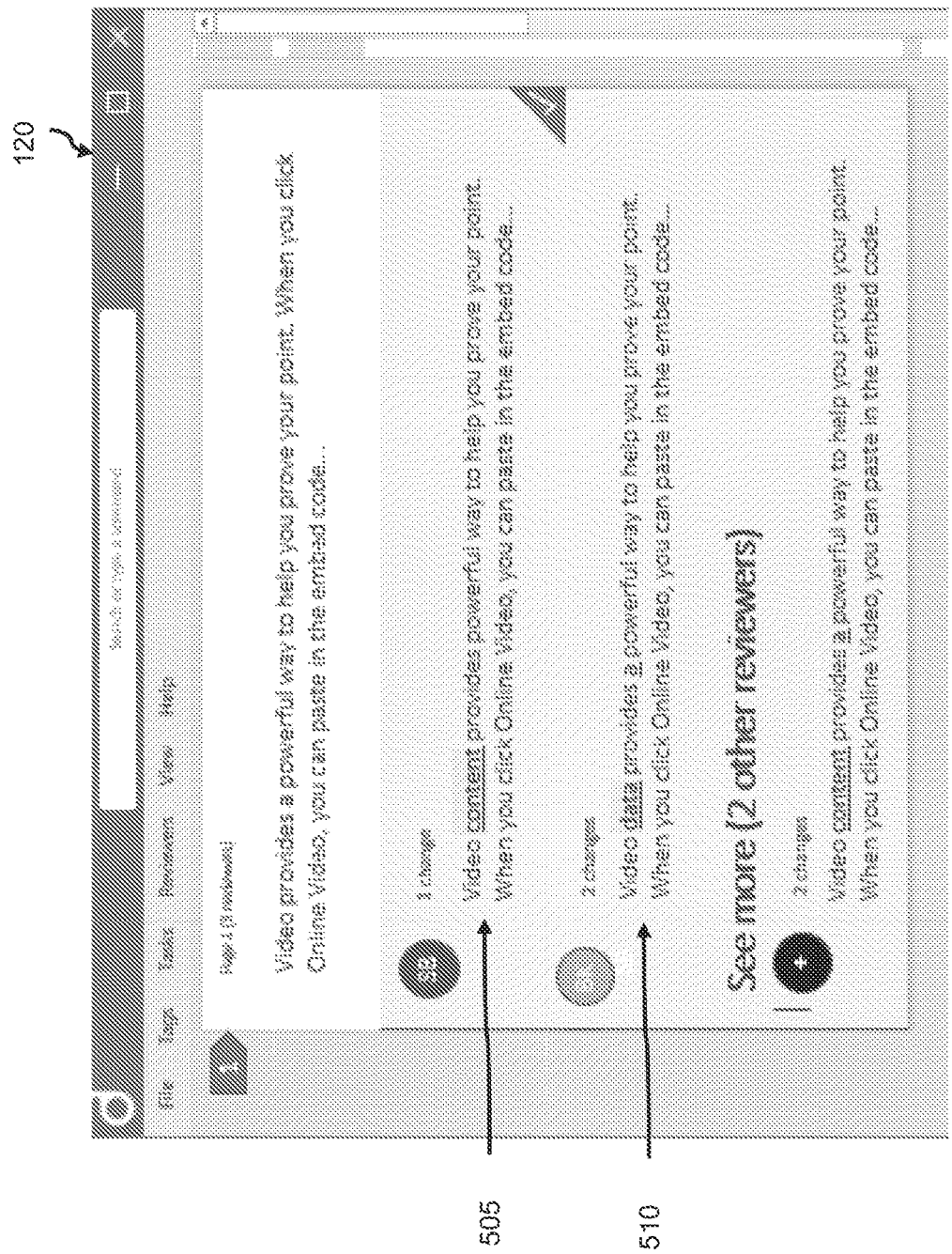
FIG. 5 is a screenshot the review UI illustrating conflict management, in accordance with one or more embodiments.

The review UI subsystem 118 may also facilitate management of conflicts between revisions. FIG. 5 is a screenshot a review UI 120 illustrating conflict management, in accordance with one or more embodiments. In some embodiments, a conflict my arise when revisions from two different reviewers are attempted to be accepted for the same content in the master document 125. For example, if the first user 140 has accepted a first revision 505 from the first reviewer 145a for inserting of a word "content" after the first word "Video" in a sentence, then a conflict may arise if the first user 140 chooses to select a second revision 510 from the second reviewer 145b for inserting another word such as "data" after the first word "Video" in the sentence. Accordingly, the review UI 120 may not allow the first user 140 to select the second revision 510 in order to avoid the conflict. For example, the review UI 120 may disable user selection of the second revision 510 by not providing the revision selection tool 415, which allows the user to accept or reject the second revision 510. In another example, the review UI 120 may automatically reject a conflicting revision after a particular revision has been selected. In another example, the review UI 120 may still allow the first user 140 to accept the second revision 510 but may present a notification indicating that the selected revision conflicts with a previously selected revision, such as the first revision 505. In some embodiments, the review UI 120 may emphasize the conflicting revisions in a number of ways, e.g., highlight the conflicting revisions. In some embodiments, the review UI subsystem 118 may use any of a number of techniques in determining if there is a conflict between two revisions.

Figure 6:
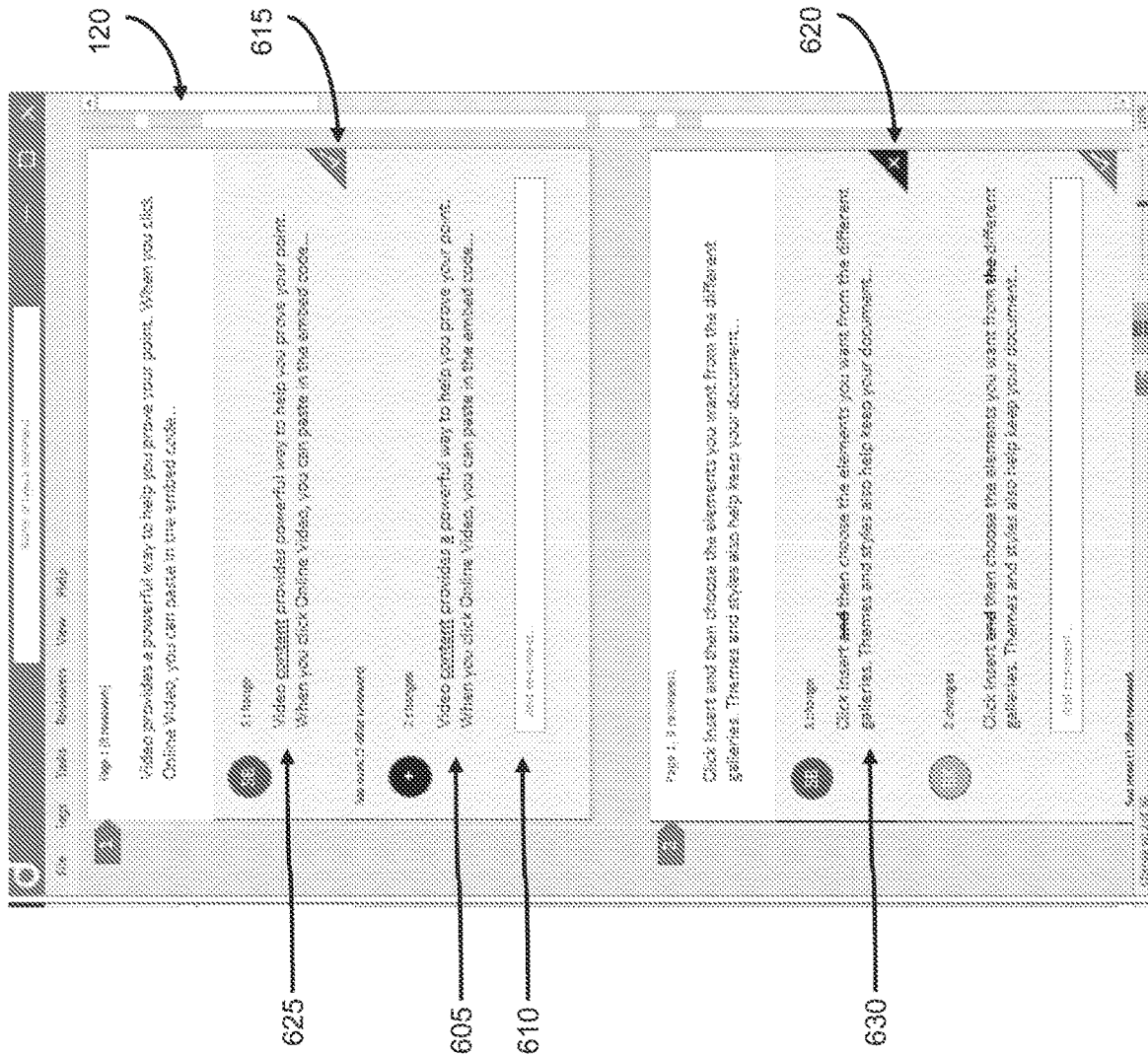
FIG. 6 shows another screenshot of the review UI, in accordance with one or more embodiments.

FIG. 6 shows another screenshot of the review UI 120, in accordance with one or more embodiments. The review UI subsystem 118 may also facilitate users to provide comments in the review UI 120 for the revisions. For example, the review UI 120 may provide a comment area 610 in which the first user 140 may provide a comment regarding the revision 605. The comment may include any description regarding the revision 605, such as a reason why the revision 605 is accepted or rejected, or it could be a question posted to the reviewer associated with the revision. In some embodiments, the review UI 120 may also facilitate the reviewers to input a comment regarding a revision, which may be presented to the first user 140 in the review UI 120. The reviewers may input the comment in the review UI 120 or may provide the comment in their revised document.

In some embodiments, the system 102 may provide various audit features. An audit feature may track and display what changes were accepted, rejected and/or revised in accepting changes from multiple reviewers or in a branch merge scenario. The audit feature may also track information such as who made the revisions, the date and time of the revisions, etc. The audit feature may also enable the users to provide reasons for making changes to a document. For example, the review UI can provide a data entry field in the review UI 120, such as the comment area 610, for a user to enter a reason why a specific portion of text is added, modified or deleted. The reason may also be linked to multiple changes or portions of the document. In some embodiments, the system 102 allows a user to select a reason from a list of reasons already used by the user or other users to assign to a specific revision. The system 102 may generate an audit report having the foregoing details. The audit report may be integrated into the document or may be generated as a separate file. In some embodiments, the audit report file may include information regarding the comparisons of the documents, the acceptances, rejections and/or changes to the document as change vector mapping. In some embodiments, the system 102 stores the audit report in the database 132 and may be accessible by one or more users. The audit report file may also be compressed, e.g., using one or more file compression techniques, to reduce the file size prior to storing in the database 132.

In some embodiments, the review UI 120 may provide a review indicator in association with a revision, which indicates whether the revision has been accepted or rejected. For example, a first review indicator 615 indicates that a revision 625 has been accepted by the first user 140. In another example, a second review indicator 620 indicates that a revision 630 has been rejected by the first user 140.

In some embodiments, the review UI 120 may also provide a read indicator (not illustrated) in association with a revision, which indicates whether a revision is read or not by the first user.

Figure 7:
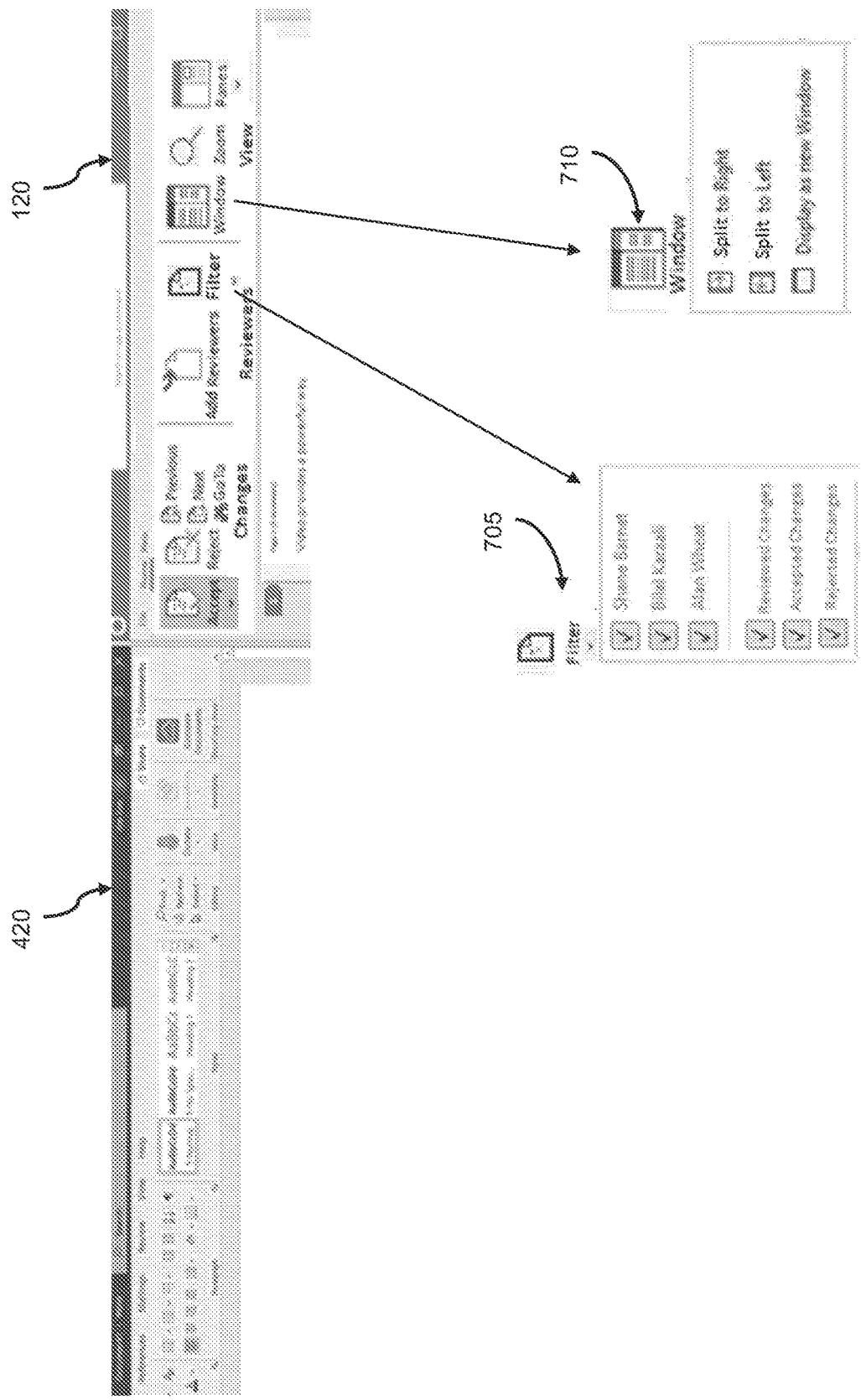
FIG. 7 is another screenshot of the review UI showing various features of the review UI, in accordance with one or more embodiments.

FIG. 7 is another screenshot of the review UI showing various features of the review UI, in accordance with one or more embodiments. In some embodiments, the review UI 120 may provide a filter tool 705 that allows the first user 140 to view a selected set of revisions. For example, the filter tool 705 may allow the first user 140 to view revisions from a particular reviewer, e.g., reviewer 145a, or a particular set of reviewers, e.g., first reviewer 145a and second reviewer 145b. In another example, the filter tool 705 may allow the first user 140 to view revisions that are accepted. In another example, the filter tool 705 may allow the first user 140 to view revisions that are rejected. In another example, the filter tool 705 may allow the first user 140 to view revisions that are read/reviewed by the first user 140.

In some embodiments, the review UI 120 may provide a positioning tool 710 that allows the first user 140 to change the placement of the review UI 120 relative to the document UI 420. For example, using the positioning tool 710, the first user 140 may adjust the position the review UI 120 to be on the left or right of the document UI 120. In some embodiments, the positioning tool 710 may also allow the first user 140 to distribute the display area of a screen (e.g., monitor or other display device associated with the first client device 135a) between the two UIs. For example, the first user may split the display area into 70:30 ratio, where "70%" of the display area is assigned to the document UI 420 and "30%" to the review UI 120. In some embodiments, the positioning tool 710 may also allow the first user 140 to distribute the two UIs to different display device if the first client device 135a has multiple display devices. For example, the document UI 420 may be displayed in a first display device (e.g., first monitor) and the review UTI 120 may be displayed in the second display device (e.g., second monitor).

Figure 8:
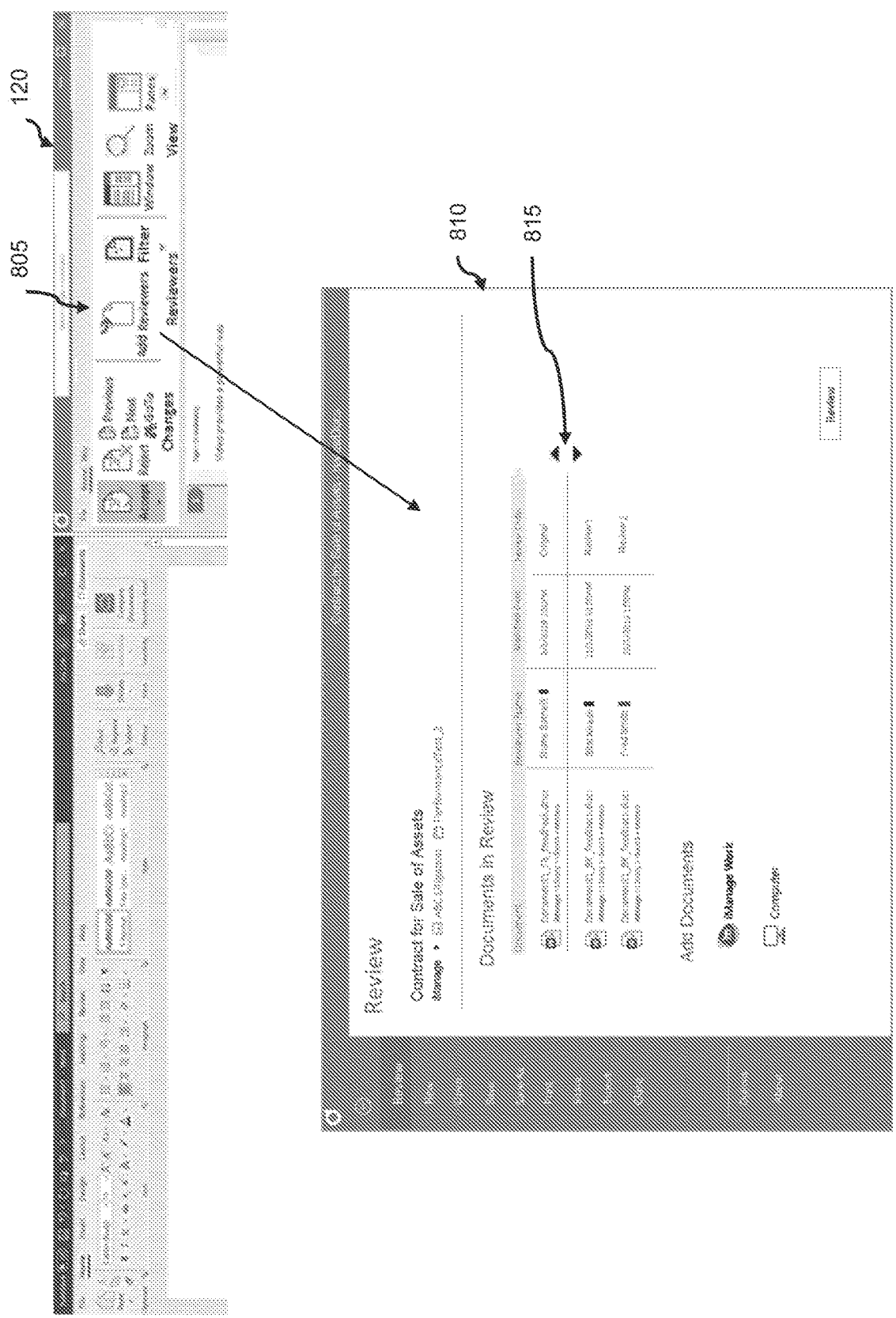
FIG. 8 is another screenshot of the review UI illustrating adding reviewers to a review that is already in progress, in accordance with one or more embodiments.

FIG. 8 is another screenshot of the review UI 120 illustrating adding of reviewers to a review that is already in progress, in accordance with one or more embodiments. As described at least with reference to FIGS. 2A-2B, the first file manager UI 200 and the second file manager UI 200 facilitates obtaining of the master document 125 and the revised documents 130a-c for performing the comparison. In some embodiments, a reviewer may be added to an existing comparison. For example, the first user 140 may add another reviewer to an existing comparison by using an "add reviewer" tool 805 which, when selected by the first user 140, presents a third file manager UI 810. The first user 140 may add the revised document of another reviewer using the third file manager UT 810 and continue with the comparison. The review UT 120 may then show the revisions from the newly added reviewer. In some embodiments, the third file manager UI 810 may also provide a sort tool 815 that allows the first user 140 to select or change the order of the documents. In some embodiments, the first user 140 may also assign a document as the master document 125 by moving the document to the "original" section in the third file manager UI 810 using the sort tool 815.

Example Flowcharts

Figure 9:
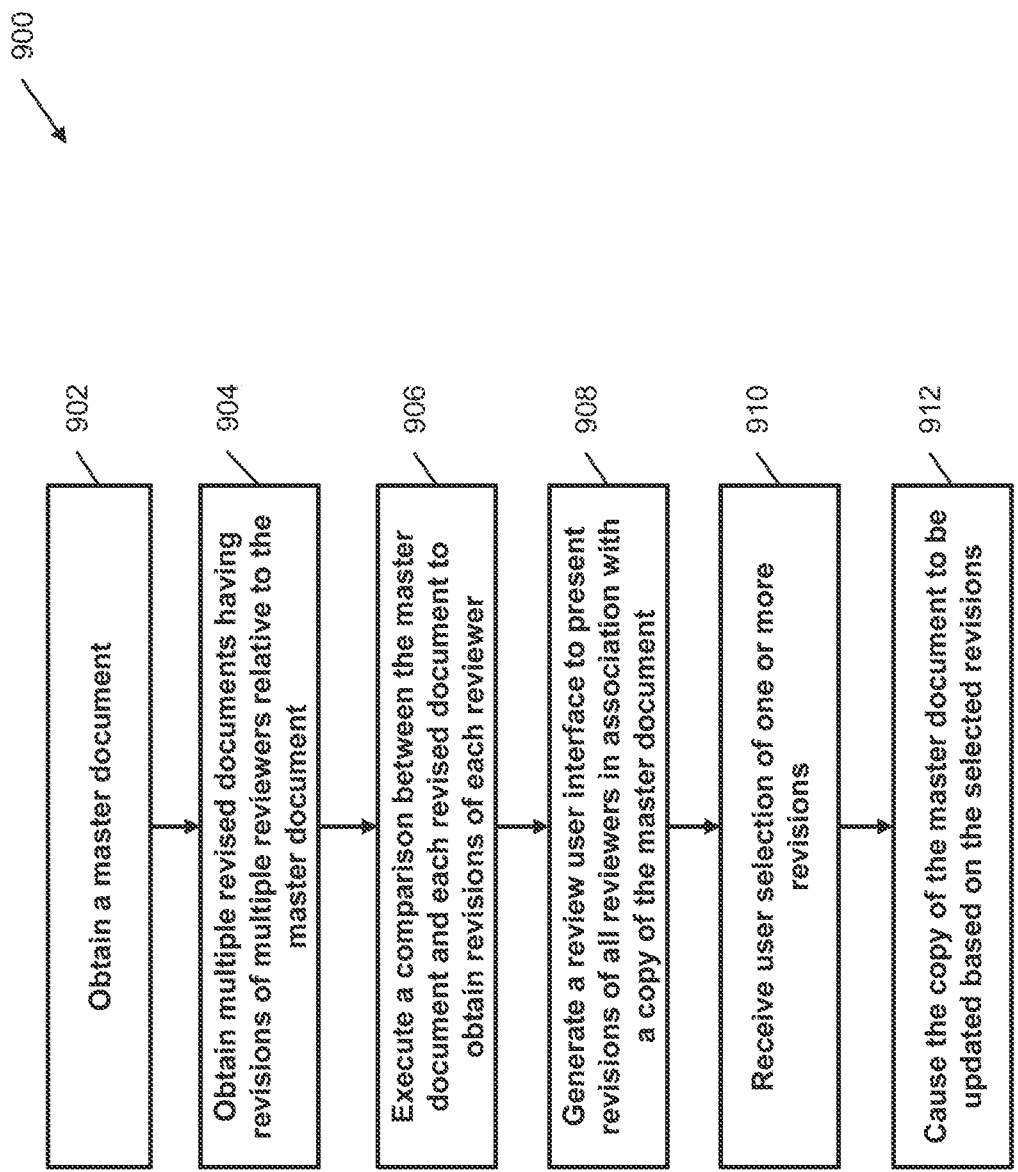
FIG. 9 shows a flowchart of a method for facilitating management of revisions from multiple reviewers, in accordance with one or more embodiments.
Figure 10:
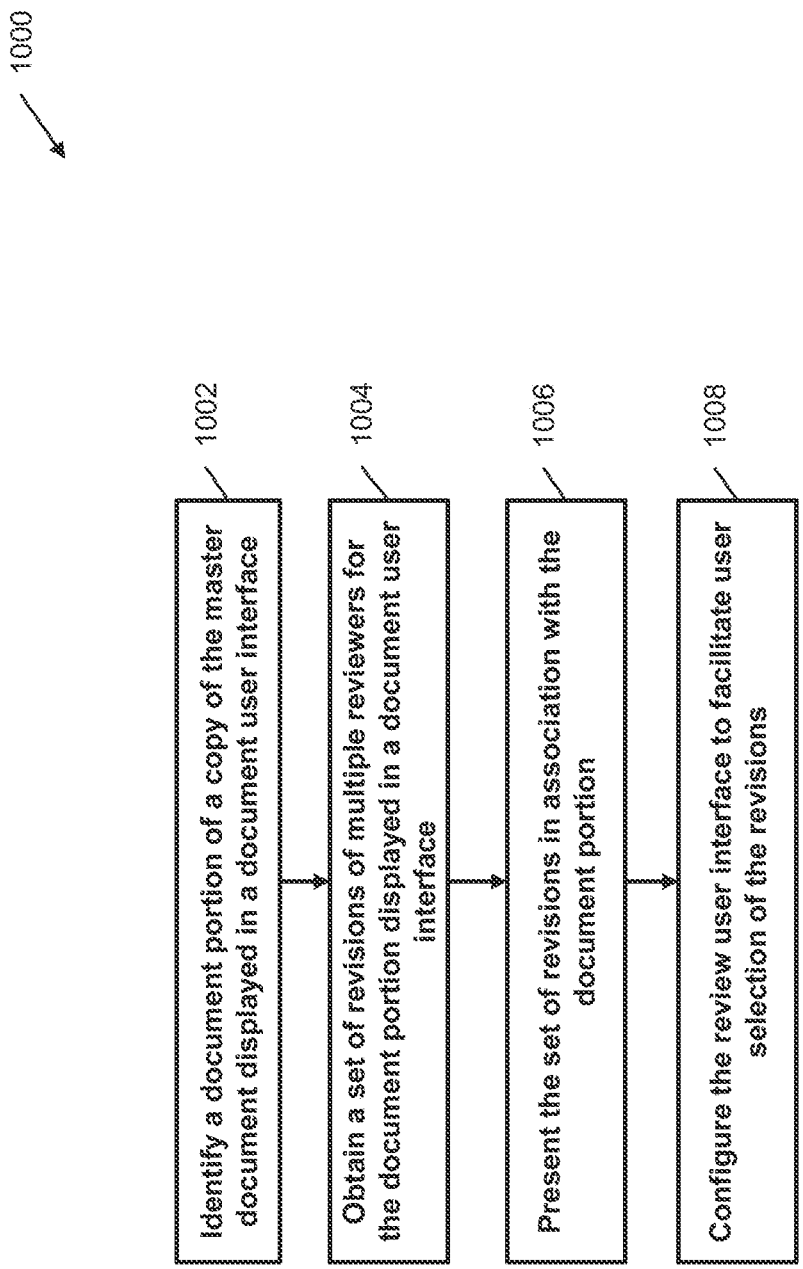
FIG. 10 shows a flowchart of a method for presenting revisions of multiple reviewers in a review UI, in accordance with one or more embodiments.
Figure 11:
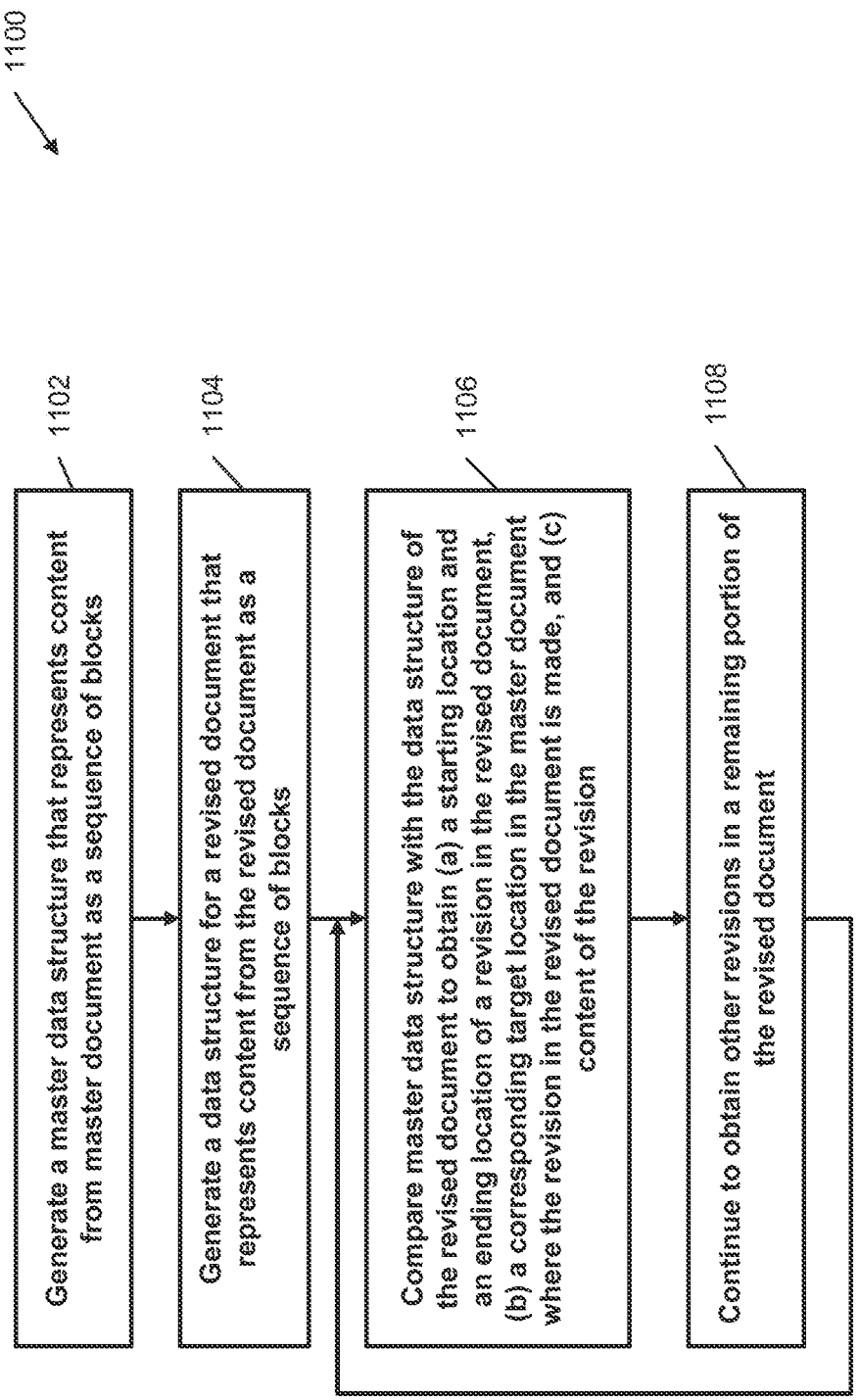
FIG. 11 shows a flowchart of a method for performing a comparison between two documents to obtain the revisions, in accordance with one or more embodiments.

FIGS. 9-11 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 9 shows a flowchart of a method 900 for facilitating management of revisions from multiple reviewers, in accordance with one or more embodiments. In an operation 902, a master document is obtained. As an example, the first user 140 may access the file manager UI of FIG. 2A using the first client device 135a to obtain the master document 125 using the first client device 135a. Operation 902 may be performed by a system that is the same as or similar to file management subsystem 112, in accordance with one or more embodiments.

In an operation 904, multiple revised documents from multiple reviewers obtained. As an example, the first user 140 may access the file manager UI of FIG. 2B using the first client device 135a to obtain the revised documents 130a-c. In some embodiments, the revised documents 130a-c are different document versions of the master document 125 having revisions from different reviewers such as the reviewers 140a-c. Operation 904 may be performed by a system that is the same as or similar to file management subsystem 112, in accordance with one or more embodiments.

In an operation 906, a comparison is executed between the master document 125 and each of the revised documents 130a-c to obtain the revisions of each of the reviewers 140a-c. As an example, the first set of revisions 405 and the second set of revisions 430 are obtained. The comparison may be performed using any of a known number of methods. Additional details with respect to executing the comparison is described at least with reference to FIGS. 3A-3C above and FIG. 11 below. Operation 906 may be performed by a system that is the same as or similar to comparison subsystem 114 and synchronization subsystem 116, in accordance with one or more embodiments.

In an operation 908, a review user interface is provided to present the revisions from the multiple reviewers. As an example, the review UI 120 is provided to the present the revisions from multiple reviewers 140a-c, such as the first set of revisions 405 and the second set of revisions 430. In some embodiments, the revisions presented in the review UI 120 are user selectable. For example, the first user may accept or reject one or more revisions displayed in the review UI 120. In some embodiments, the review UT 120 is presented on a display device along with a copy of the master document 145, which is presented in another UI, such as the document UI 420. Operation 908 may be performed by a system that is the same as or similar to the review UI subsystem 118, in accordance with one or more embodiments.

In an operation 910, a user selection of one or more revisions is received. As an example, a user selection indicating an acceptance of a first revision 406 in the first set of revisions 405 is received. The first revision 406 may correspond to insertion of a word "content" in the document portion 410 of the master document. Operation 910 may be performed by a system that is the same as or similar to the review UI subsystem 118, in accordance with one or more embodiments.

In an operation 912, a copy of the master document 145 is updated based on the user selection of the one or more revisions. As an example, in response to receiving the acceptance of the first revision 406, the copy of the master document 145 is caused to be updated by inserting the word "content" in the document portion 435 of the copy of the master document 145 corresponding to the document portion 410 of the master document 125. In some embodiments, updating the copy of the master document may include obtaining details such as (a) the location coordinates of the first revision 406 in the revised document 130a, (b) the content of the first revision 406, and (c) a target location coordinate in the master document 125, which is a location in the master document 125 corresponding to location where the revision occurs in the revised document 130a, as described at least with reference to FIGS. 3A-3C. The copy of the master document 145 is then updated based on the above obtained details. Operation 912 may be performed by a system that is the same as or similar to the review UI subsystem 118, in accordance with one or more embodiments.

FIG. 10 shows a flowchart of a method 1000 for presenting revisions of multiple reviewers in a review UI, in accordance with one or more embodiments. In some embodiments, method 1000 may be performed as part of operation 908 of method 900 of FIG. 9.

As described at least with reference to FIG. 1, in some embodiments, the review UI 120 groups the revisions from the reviewers based on a document portion (e.g., a paragraph) of the master document 125 for which the revisions are received. In an operation 1002, a document portion of the copy of the master document 145 that is currently being displayed to the first user 140 in the document UI 420 is identified. As an example, it is determined that the document UI 420 is displaying a document portion 435, which has three paragraphs of a first page of the copy of the master document 145, as illustrated in FIG. 4. Operation 1002 may be performed by a system that is the same as or similar to the review UI subsystem 118, in accordance with one or more embodiments.

In an operation 1004, a set of revisions corresponding to the document portion displayed in the document UI 420 is obtained. As an example, the document portion 410 of the master document 125 (e.g., the first paragraph of the first page) corresponding to the document portion 435 of the copy of the master document 145 (e.g., the first paragraph of the first page) is identified and the first set of revisions 405 having revisions corresponding to the document portion 410 of the master document 125 is obtained. Similarly, the third paragraph of the first page of the master document 125 corresponding to the third paragraph of the first page of the copy of the master document 145 is identified and the second set of revisions 430 corresponding to the third paragraph of the first page of the master document is obtained. Operation 1004 may be performed by a system that is the same as or similar to the review UI subsystem 118, in accordance with one or more embodiments.

In an operation 1006, the set of revisions corresponding to the document portion displayed in the document UI 420 is presented in the review UI 120. As an example, the first set of revisions 405 and the second set of revisions 430 are presented in the review UI 120. The first set of revisions 405 may include revisions from multiple reviewers 140a-c for a document portion 410 of the master document 125 and the second set of revisions 430 may include revisions from multiple reviewers 140a-c for another document portion of the master document 125 (e.g., third paragraph of the first page), as described at least with reference to FIG. 4. The second paragraph of the copy of the master document 145 does not have any revisions associated with it and hence, no revisions are displayed for the second paragraph. Operation 1006 may be performed by a system that is the same as or similar to the review UI subsystem 118, in accordance with one or more embodiments.

In an operation 1008, the review UI is configured to make the set of revisions user selectable. As an example, the review UI 120 is configured to make the first set of revisions 405 and the second set of revisions 430 user selectable. In some embodiments, selecting a revision may include accepting or rejecting the revision. The first user 140 may also choose to ignore the revision (e.g., neither accept nor reject). The first user 140 may select one or more revisions from the first set of revisions 405 or the second set of revisions 430. Operation 1008 may be performed by a system that is the same as or similar to the review UI subsystem 118, in accordance with one or more embodiments.

FIG. 11 shows a flowchart of a method 1100 for performing a comparison between two documents to obtain the revisions, in accordance with one or more embodiments. In some embodiments, method 1100 may be performed as part of operation 906 of method 900 of FIG. 9. In some embodiments, a data structure representative of the content of a document is generated for each of the documents to be compared.

As described at least with reference to FIG. 3A, in an operation 1102, a data structure that is representative of the content of the master document is generated. In some embodiments, the data structure represents the content as a sequence of one or more blocks. As an example, the master data structure 312 representing the content "This is text" of the master document 325 as "Block 0" is generated. Operation 1102 may be performed by a system that is the same as or similar to the synchronization subsystem 116, in accordance with one or more embodiments.

In an operation 1104, a data structure that is representative of the content of a revised document is generated. In some embodiments, the revised document includes revisions relative to the master document. As an example, the first data structure 316 representing the content of revision A document 330a "This is Word" using two blocks in which "Block 0" represents "This is" and "Block 1" represents "Word" is generated. Operation 1104 may be performed by a system that is the same as or similar to the synchronization subsystem 116, in accordance with one or more embodiments.

In an operation 1106, a comparison between the master document and the revised document is executed to obtain revision details such as (a) the location coordinates of a revision in the revised document (e.g., a starting location and an ending location of the revision), (b) the content of the revision, and (c) a target location coordinate in the master document, which is a location in the master document corresponding to location where the revision occurs in the revised document, as described at least with reference to FIGS. 3A-3C. As an example, a comparison is executed between the master document 325 and the revision A document 330a using their data structures—master data structure 312 and first data structure 316—to obtain the second comparison 324 having the revision details. The second comparison 324 indicates that the content from (0,9) to (0,13) in the master document 325 (e.g., which corresponds to the word "text") is changed/revised to the content from (1,1) to (1,5) in the revision A document 330a (e.g., which corresponds to the word "Word"). That is, the second comparison 324 obtains revision details including (a) a target location coordinate (0, 9) of the master document 325 at which the revision occurs, (b) a starting location coordinate and an ending location coordinate (e.g., (1,1) to (1,5)) of the revision in the revision A document 330a, and (c) the content or details of the revision (e.g., as replacement of "text" with "Word"). Operation 1106 may be performed by a system that is the same as or similar to the comparison subsystem 114 and the synchronization subsystem 116, in accordance with one or more embodiments.

In an operation 1108, the method 1100 continues until the remaining portion of the revised document is compared with the master document to obtain revision details of any of the remaining of the revisions.

In some embodiments, the method 1100 may be executed for each of the revised documents that is being compared with the master document (e.g., revision documents 130a-c) to obtain revisions of all the reviewers (e.g., reviewers 145a-c).

Figure 12:
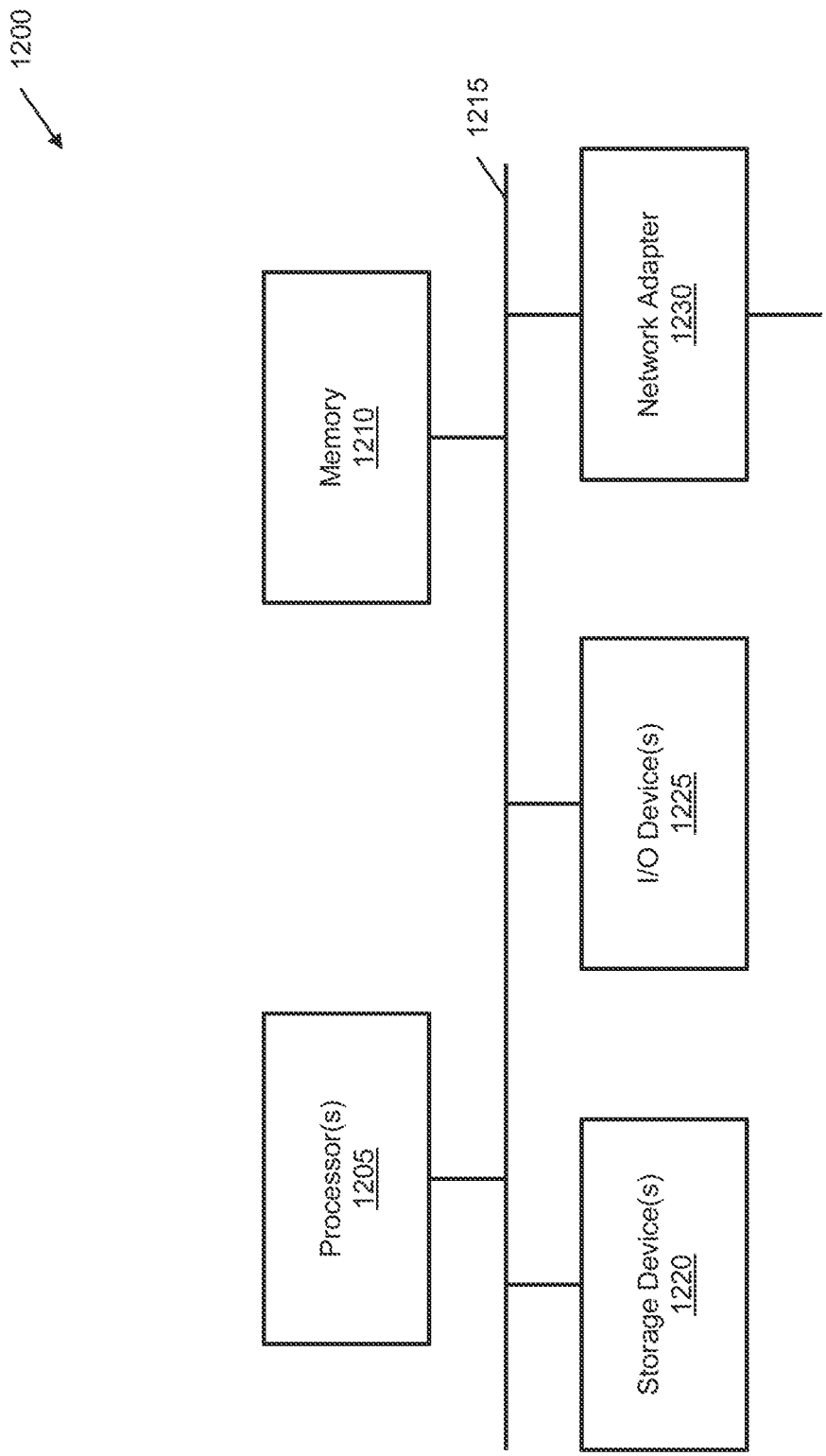
FIG. 12 is a block diagram of a computer system as may be used to implement features of the disclosed embodiments.

FIG. 12 is a block diagram of a computer system as may be used to implement features of the disclosed embodiments. The computer system 1200 may be used to implement any of the entities, subsystems, components or services depicted in the examples of the foregoing figures (and any other components described in this specification). The computer system 1200 may include one or more central processing units ("processors") 1205, memory 1210, input/output devices 1225 (e.g., keyboard and pointing devices, display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1210 and storage devices 1220 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The instructions stored in memory 1210 can be implemented as software and/or firmware to program the processor(s) 1205 to carry out actions described above. The processors may be programmed to execute computer program instructions by software; hardware; firmware; some combination of software, hardware, or firmware; and/or other mechanisms for configuring processing capabilities on the processors. In some embodiments, such software or firmware may be initially provided to the computer system 1200 by downloading it from a remote system through the computer system 1200 (e.g., via network adapter 1230).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer system comprising:
a merge interface configured to graphically display one or more user selections; and
at least one processor communicatively coupled with the merge interface, the at least one processor being programmed with computer program instructions that, when executed, cause operations for
comparing, for each modified file of a plurality of modified files, a data structure of the corresponding modified file with a reference data structure of a reference file,
in response to the comparing, obtaining for each modified file of the plurality of modified files changes made by a user of a plurality of users, the changes being relative to the reference file,
obtaining, via the merge interface, a set of changes of the plurality of users, the set of changes being associated with a first content portion of the reference file,
graphically displaying the set of changes in the merge interface,
receiving on the merge interface a user selection of at least one change from the set of changes, the user selection interacting with the merge interface for selecting the at least one change, and
in response to the receiving of the user selection, merging the set of changes in the merge interface with a copy of the reference file.

2. The system of claim 1, wherein the computer program instructions further cause, when executed, operations for updating the reference file, in response to the receiving of the user selection, based on the at least one change.

3. The system of claim 2, wherein the updating of the reference file includes:
determining that a specified user associated with the reference file has accepted a first change of the set of changes from a first user and a second change of the set of changes from a second user, and
updating the copy of the reference file based on the first change and the second change.

4. The system of claim 1, wherein the computer program instructions further cause, when executed, operations for
receiving a user selection of a first change from the set of changes, the first change being associated with a first user of the plurality of users and corresponding to a specified content in the reference file, and
in response to the user selection of the first change, configuring the merge interface to disable user selection of a second change associated with a second user of the plurality of users, wherein the second change corresponds to the specified content in the reference file.

5. The system of claim 1, wherein the computer program instructions further cause, when executed, operations for receiving an acceptance or rejection of one or more of the changes made by the user of the plurality of users.

6. The system of claim 1, wherein the computer program instructions further cause, when executed, operations for adding, removing, or changing content in a content portion of the copy of the reference file based on the user selection, wherein the content portion of the copy of the reference file corresponds to the first content portion of the reference file.

7. The system of claim 1, wherein the computer program instructions further cause, when executed, operations for
receiving user acceptance of a first change from the set of changes, the first change being associated with a first user of the plurality of users,
receiving user acceptance of a second change from the set of changes, the second change associated with a second user of the plurality of users, and
updating the copy of the reference file based on the first change and the second change.

8. The system of claim 1, wherein the computer program instructions further cause, when executed, operations for
receiving a user selection of a first change from the set of changes, the first change associated with a first user of the plurality of users and corresponding to a specified content in the reference file, and
in response to the user selection, configuring the merge interface to disable user selection of a second change associated with a second user of the plurality of users, wherein the second change corresponds to the specified content in the reference file.

9. The system of claim 1, wherein the computer program instructions further cause, when executed, operations for
obtaining a comment associated with a first change of the set of changes, the comment including a description provided by a first user of the plurality of users regarding the first change, and
providing the comment to the merge interface for presentation in association with the first change.

10. The system of claim 1, wherein the computer program instructions further cause, when executed, operations for obtaining, via the merge interface, user input of a comment from a specified user of the plurality of users, the comment including a description provided by the specified user for accepting or rejecting a first change of the set of changes.

11. The system of claim 1, wherein the computer program instructions further cause, when executed, operations for providing a user indicator in association with each change of the set of changes, the user indicator being indicative of a user associated with the corresponding change.

12. The system of claim 1, wherein the computer program instructions further cause, when executed, operations for providing one or more change location indicators that are indicative of a location of a content portion of the copy of the reference file having one or more of the changes.

13. The system of claim 12, wherein the one or more change location indicators are generated in a scroll bar associated with the merge interface.

14. The system of claim 1, wherein the computer program instructions further cause, when executed, operations for providing a review indicator in association with the set of changes, the review indicator being indicative of whether the set of changes is read by the specified user.

15. The system of claim 1, wherein the computer program instructions further cause, when executed, operations for providing a filter to facilitate presentation of a selected set of changes in the merge interface, the selected set of changes including (a) changes associated with one or more of the plurality of users, (b) changes accepted by a specified user, (c) changes rejected by the specified user, or (d) changes reviewed by the specified user.

16. The system of claim 1, wherein the computer program instructions further cause, when executed, operations for providing a positioning tool to adjust a position of the merge interface in relation to a file interface presenting the copy of the reference file.

17. The system of claim 1, wherein the computer program instructions further cause, when executed, operations for
obtaining a plurality of other files; and
providing, via the merge interface, a tool to assign one of the plurality of other files as the reference file.

18. The system of claim 1, wherein the computer program instructions further cause, when executed, operations for providing a specified data structure that represents content from a specified file as a sequence of blocks, each block being representative of a distinct portion of the content from the specified file, the specified data structure facilitating locating a specified content in the specified file using a location coordinate, the location coordinate including (a) a block number that is indicative of a block in the sequence of blocks in which the specified content is located, and (b) a position that is indicative of a location of the specified content within the block.

19. A computer system comprising:
a merge interface configured to graphically display one or more user selections; and
at least one processor communicatively coupled with the merge interface, the at least one processor being programmed with computer program instructions that, when executed, cause operations for
comparing, for each modified file of a plurality of modified files, a data structure of the corresponding modified file with a reference data structure of a reference file,
in response to the comparing, obtaining for each modified file of the plurality of modified files changes made by a user of a plurality of users, the changes being relative to the reference file,
obtaining, via the merge interface, a set of changes of the plurality of users, the set of changes being associated with a first content portion of the reference file,
graphically displaying the set of changes in the merge interface,
receiving on the merge interface a user selection of at least one change from the set of changes, the user selection interacting with the merge interface for selecting the at least one change,
in response to the receiving of the user selection, merging the set of changes in the merge interface with a copy of the reference file, and
configuring the merge interface to facilitate a specified user associated with the reference file to accept or reject the one or more changes.

20. A computer system comprising:
a merge interface; and
at least one processor communicatively coupled with the merge interface, the at least one processor being programmed with computer program instructions that, when executed, cause operations for
comparing, for each modified file of a plurality of modified files, a data structure of the corresponding modified file with a reference data structure of a reference file,
in response to the comparing, obtaining for each modified file of the plurality of modified files changes made by a user of a plurality of users, the changes being relative to the reference file,
obtaining, via the merge interface, a set of changes of the plurality of users, the set of changes being associated with a first content portion of the reference file,
graphically displaying the set of changes in the merge interface,
receiving on the merge interface a user selection of at least one change from the set of changes, the user selection interacting with the merge interface for selecting the at least one change,
in response to the receiving of the user selection, merging the set of changes in the merge interface with a copy of the reference file, and
providing a change selection tool to accept changes associated with one or more of the plurality of users.

* * * * *